(12) United States Patent
Priest et al.

(10) Patent No.: US 6,471,503 B1
(45) Date of Patent: Oct. 29, 2002

(54) ROTARY DISC VALVE ASSEMBLY FOR USE WITH AN INJECTION MOLD COOLING SYSTEM

(75) Inventors: Wayne A. Priest, Kansas City, KS (US); Teryl K. Rouse, Kansas City; Mark A. Brown, Oak Grove, both of MO (US); Kendall D. Foos, Olathe; Joe D. Blubaugh, Shawnee, both of KS (US)

(73) Assignee: Burger & Brown Engineering, Inc., Olathe, KS (US)

( * ) Notice: Subject to any disclaimer, the term of this patent is extended or adjusted under 35 U.S.C. 154(b) by 91 days.

(21) Appl. No.: 09/707,328

(22) Filed: Nov. 7, 2000

(51) Int. Cl.[7] .................................................. A23P 1/00
(52) U.S. Cl. ................. 425/547; 425/552; 425/DIG. 9; 137/625.41; 137/625.46
(58) Field of Search ................................ 425/407, 547, 425/552, DIG. 9; 137/625.41, 625.46; 165/71, 104.19, DIG. 92, DIG. 126

(56) References Cited

U.S. PATENT DOCUMENTS

| | | |
|---|---|---|
| 3,405,734 A | 10/1968 | Smit et al. |
| 4,049,019 A | 9/1977 | McClocklin |
| 4,278,230 A | 7/1981 | Allen |
| 4,330,008 A | 5/1982 | Skelly |
| 4,367,785 A | 1/1983 | Allen |
| 4,475,572 A | 10/1984 | Brausfeld et al. |
| 4,621,679 A | 11/1986 | Byers et al. |
| 4,680,001 A | 7/1987 | Waters |
| 4,823,550 A | 4/1989 | Decker |
| 4,934,918 A | 6/1990 | Outland |
| 5,659,347 A | * 8/1997 | Taylor .................... 137/625.41 |
| 5,686,122 A | 11/1997 | Huntingdon et al. |
| 5,738,520 A | 4/1998 | Auntin, Jr. et al. |

* cited by examiner

Primary Examiner—Jan H. Silbaugh
Assistant Examiner—Donald Heckenberg
(74) Attorney, Agent, or Firm—Shughart Thomson & Kilroy P.C.

(57) ABSTRACT

A rotary disc valve is disclosed which generally includes a housing having an inlet side and an outlet side, and a disc rotatably mounted within the housing between the inlet side and the outlet side thereof. The disc includes an outlet bore which is generally aligned with the axis of rotation of the disc and extends from the outlet face of the disc partially through the disc. One or more inlet bores spaced radially outwardly from the axis of rotation of the disc extend from the inlet face of the disc partially through the disc and communicate with the outlet bore. The inlet bore or bores are located such that a bore may be selectively brought into communication with a single one of inlet side passages by rotating the disc until the bore is aligned with the desired passage. Since the outlet bore and an outlet passage are aligned along the center of rotation of the disc, the outlet bore stays in constant communication with the outlet passage in the outlet side of the housing as the disc is rotated. Therefore, by rotating the disc until an inlet passage is aligned with a respective disc inlet bore, that inlet passage is brought into communication with the outlet passage, making it possible for a fluid to flow through the valve between the inlet and outlet sides.

16 Claims, 4 Drawing Sheets

ROTARY DISC VALVE ASSEMBLY FOR USE WITH AN INJECTION MOLD COOLING SYSTEM

BACKGROUND OF THE INVENTION

1. Field of the Invention

This invention relates to the field of valves, and in particular to a rotary disc valve specifically designed for use in an injection mold cooling system.

2. Description of the Related Art

In the injection molding process, hot material is injected into a cavity within a mold for formation into useful articles. The mold is then cooled by circulating cooling water through a plurality of cooling passages which pass through the mold. The cooling water is provided from a cooling water source through an inlet line to a supply manifold which is, in turn, connected to the mold by a plurality of mold supply lines. The cooling water flows from the mold through a plurality of mold return lines to a return manifold, and then into a return line where it is channeled back to the source.

When it is time to change molds, the cooling water supply must be shut off and then the mold supply and return lines must be disconnected from the mold. If the cooling water is not drained from the mold and the supply and return lines before the lines are disconnected, cooling water will be spilled on the floor surrounding the injection molding machine. Cooling water on the floor can present a safety hazard to personnel working around the molding machine, and therefore time and resources must be expended to clean it up. Each individual supply and return line can be drained as it is disconnected, however this is a time consuming process which still often results in spills which must be cleaned up.

What is needed is an efficient way to purge all of the cooling water from the mold cooling system before the supply and return lines are disconnected. In order to accomplish this task, a valve must be provided which can selectively supply cooling water and purge air to the mold. Another convenient feature would be if the valve incorporated a vent for releasing the purge air to the atmosphere after the mold is purged of cooling water.

Multi-way valves are well known in the art, however none of these valves is ideally suited for use in an injection mold cooling system as described. Many are unnecessarily complex and expensive to manufacture. A rotary disc valve is disclosed by U.S. Pat. No. 3,405,734 to G. H. Smit, et al., entitled Self-Draining Valve. This valve is designed for use as a distribution valve in cold weather outdoor applications where a valve must be self-draining to prevent it from freezing and breaking.

The valve includes a disc which is rotatably mounted between inlet and outlet side plates. The outlet side plate includes multiple outlet passages and a drain passage which are spaced radially outwardly from the axis of rotation of the disc, which is defined by a bolt passing through the center of the disc and both side plates. The inlet side plate includes a single inlet line which is spaced radially outwardly from the axis of rotation of the disc and connects to an annular trough which is machined into the inner surface of the inlet side plate. The disc includes a single bore which passes completely through the disc and is spaced radially outwardly from the axis of rotation of the disc so that it stays in communication with the annular trough of the inlet side plate as the disc is rotated. By rotating the disc, the disc bore can be brought into communication with one of the outlet passages, allowing fluid to flow through the valve from the inlet passage to that outlet passage. The disc further includes a generally annular groove formed in the side adjacent the outlet side plate of the valve. This groove is designed to communicate the outlet passages to the drain passage when the valve is in the off position, allowing the outlet lines to drain.

The valve disclosed by Smit, et al. is not specially designed for use as a purge valve for a injection mold cooling system and would be unnecessarily complex for this application as its self-draining features are not required in a heated indoor molding facility. What is needed is a simple, compact, and economical rotary disc valve which is suitable for use as a purge valve in an injection mold cooling system.

SUMMARY OF THE INVENTION

The present invention comprises a rotary disc valve which may be configured as a three-way purge valve for use in an injection mold cooling system. The valve generally includes a housing having an inlet side and an outlet side, and a disc mounted within the housing between the inlet side and the outlet side thereof, the disc being rotatable about its central axis. The disc has an inlet face which is adjacent the inlet side of the housing and an outlet face which is adjacent the outlet side of the housing. The disc is provided with a handle which extends radially outwardly from the disc outer circumferential surface which is used for manually rotating the disc relative to the housing.

The inlet side of the housing includes a plurality of inlet side passages which are spaced radially outwardly from the axis of rotation of the disc and extend through the inlet side of the housing such that they communicate with the inlet face of the disc. The outlet side of the housing includes a single outlet passage which is generally aligned with the axis of rotation of the disc and extends through the outlet side of the housing such that it communicates with the outlet face of the disc.

The disc includes an outlet bore which is generally aligned with the axis of rotation of the disc and extends from the outlet face of the disc partially through the disc. One or more inlet bores spaced radially outwardly from the axis of rotation of the disc extend from the inlet face of the disc partially through the disc and communicate with the outlet bore.

The inlet bore or bores are located such that a bore may be selectively brought into communication with a single one of the inlet side passages by rotating the disc until the bore is aligned with the desired passage. Since the outlet bore and outlet passage are aligned along the center of rotation of the disc, the outlet bore stays in constant communication with the outlet passage in the outlet side of the housing as the disc is rotated. Therefore, by rotating the disc until an inlet passage is aligned with a respective disc inlet bore, that inlet passage is brought into communication with the outlet passage, making it possible for a fluid to flow through the valve between the inlet and outlet sides.

When configured for use as part of an injection mold cooling system the inlet passages are designated as a cooling water inlet passage and a purge air inlet passage. The inlet side of the housing may also be equipped with an air vent passage for releasing purge air from the cooling system after the cooling water is purged out.

OBJECTS AND ADVANTAGES OF THE INVENTION

The principal objects and advantages of the present invention include: providing a purge valve for an injection mold cooling system; providing such a valve which allows the operator to easily purge the cooling water from the mold and cooling lines; and providing such a valve which is compact, economical to manufacture, efficient in operation, capable of a long operating life and particularly well-adapted for the proposed usage thereof

DETAILED DESCRIPTION OF THE PREFERRED EMBODIMENTS

I. Background and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof Said terminology will include the words specifically mentioned, derivatives thereof and words of a similar import.

II. First Embodiment

Figure 1:
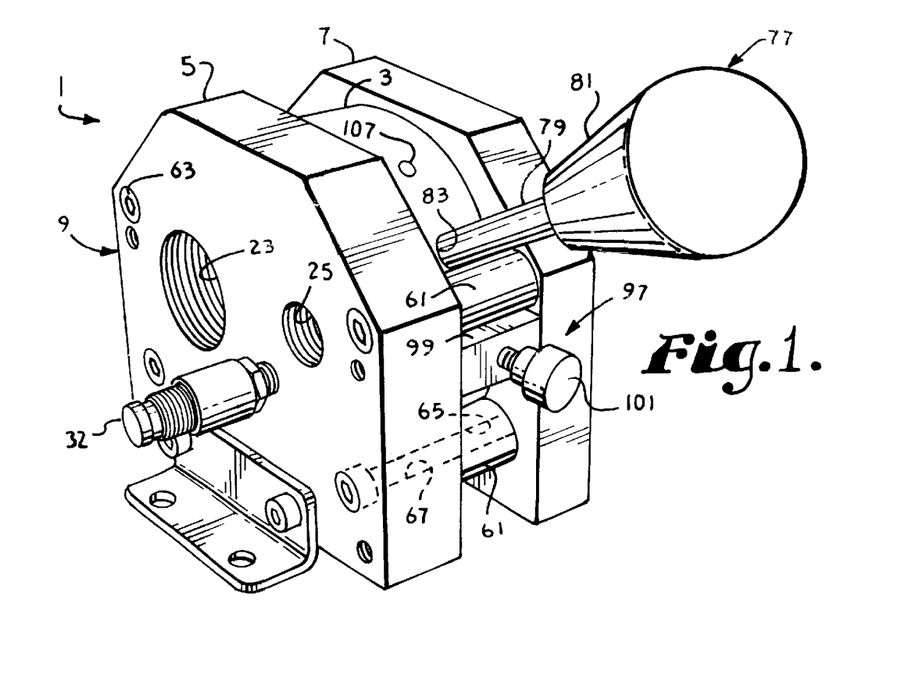
FIG. 1 is a perspective view of a rotary disc valve assembly embodying the present invention.
Figure 2:
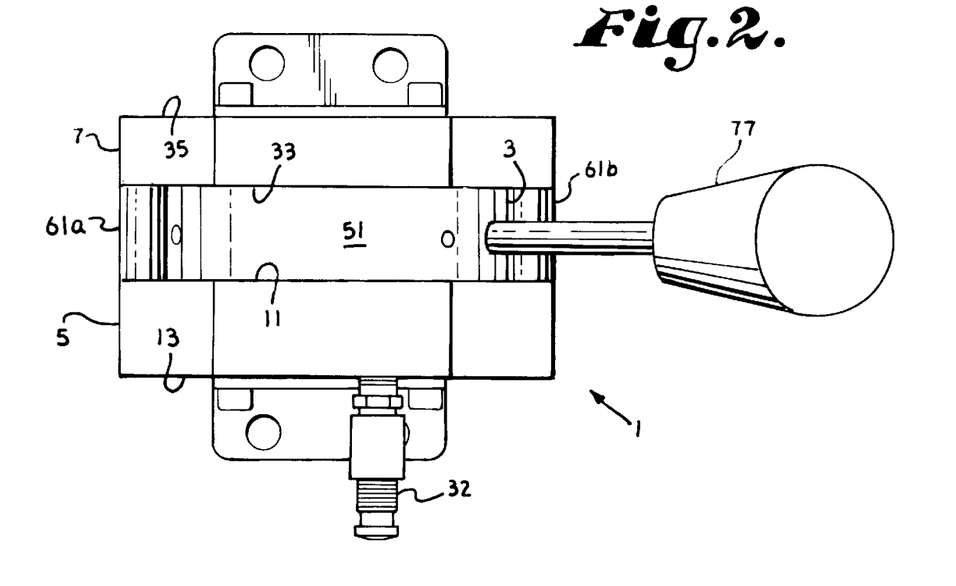
FIG. 2 is a top view of the valve assembly.

Referring to the drawings in more detail, the reference number 1 generally designates a three-way purge valve embodying the present invention which is specifically adapted for use with an injection mold cooling system. As shown in FIGS. 1 and 2, the valve 1 generally comprises a valve disc 3 rotatably mounted between an inlet side 5 and an outlet side 7 of a valve housing 9.

Figures 3, 4, 5:
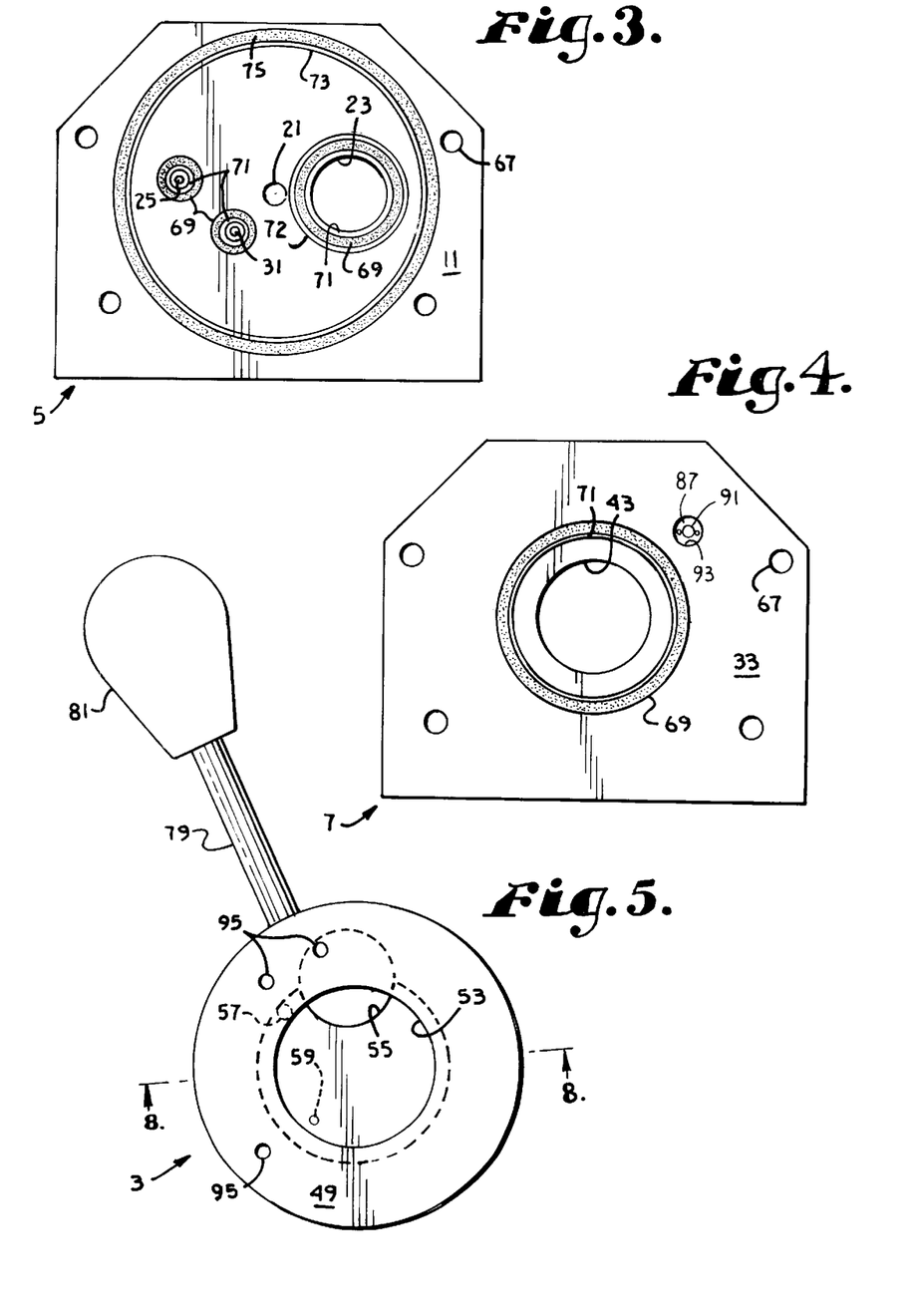
FIG. 3 is a view of the inner surface of the inlet side plate of the valve assembly.
FIG. 4 is a view of the inner surface of the outlet side plate of the valve assembly.
FIG. 5 is a view of the valve disc taken from the outlet side.

The housing 9 is preferably manufactured of a non-corrosive, durable, and easily machinable material such as 360 brass. Referring to FIG. 3, The inlet side 5 of the housing 9 can take the form of a plate having an inner surface 11 and an outer surface 13. The inner surface 11 of the inlet side plate 5 includes an axle receiver 21 sized and shaped to rotatably receive a stub axle 22 of the disc 3 to be described later. The axle receiver 21 defines a generally horizontal axis of rotation for the disc 3.

Spaced radially outwardly from the axle receiver 21 at varying angles are a water inlet passage 23 and an air inlet passage 25 which each include internal threads for connecting respective water and air supply lines 27 and 29. In a preferred embodiment, the inlet side plate 5 also includes an air vent passage 31 spaced radially outwardly from the axle receiver 21 which includes internal threads for receiving a manual vent valve 32. The passages 23, 25, and 31 each extend through the inlet side plate 5 from the outer surface 13 to the inner surface 11. The passages 27 and 31, being designated for the transmission of pressurized air, may each include restrictions such that the opening in the inner surface 11 in the inlet plate 5 is smaller than the internally threaded portion of the passage.

The outlet side 7 of the housing 9 (shown in FIG. 4) also comprises a plate having an inner surface 33 and an outer surface 35. An outlet passage 43 extends through the outlet side plate 7 from the inner surface 33 to the outer surface 35 thereof The outlet passage 43 is centered along the axis of rotation of the disc 3 and includes internal threads for receiving an outlet line 45 (see FIG. 9).

The disc 3 (FIGS. 5 and 6) serves to selectively communicate one of the passages 23, 25, or 31 of the inlet side plate 5 with the outlet passage 43 of the outlet side plate 7. The disc 3 is preferably formed of a durable, non-corrosive material, such as 303 stainless steel, and has opposing inlet and outlet faces 47 and 49, respectively, and an outer circumferential surface 51. The stub axle 22 extends outwardly from the inlet face 47 along the central axis of the disc 3. As will be discussed in detail later, the range of rotation of the disc 3 is limited.

Figure 6:
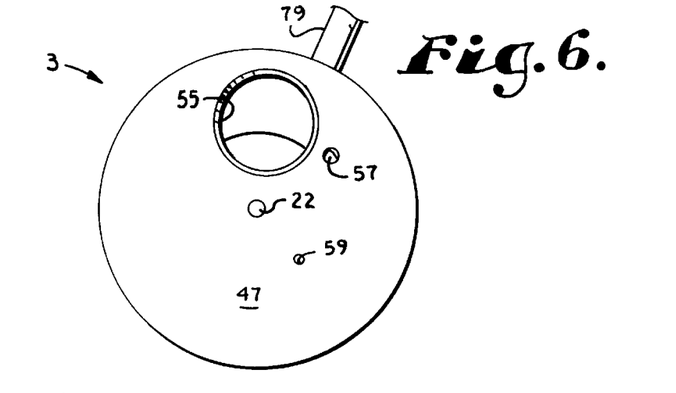
FIG. 6 is a view of the valve disc taken from the inlet side.

The disc 3 includes an outlet bore 53 which extends partially into the disc 3 from the outlet face 49 along the central axis of the disc 3. A water inlet bore 55, an air inlet bore 57, and a vent bore 59 each extend between the outlet bore 53 and the disc inlet face 47. The bores 55, 57, and 59 are spaced radially outward from the central axis of the disc 3 and are positioned such that each bore can only be brought into alignment with a respective one of the passages 23, 25, and 31 in the in the inlet side plate 5, within the limited range of rotation of the disk 3. The bores 55, 57, and 59 are also positioned such that only one of the bores may be aligned with its respective inlet side passage 23, 25, or 31 at a time. The water inlet bore 55, therefore, will only align with the water inlet passage 23, and when the bore 55 and passage 23 are so aligned, the bores 57 and 59 are blocked off by the inner surface 11 of the inlet side plate. Similarly, the air inlet bore 57 can only be aligned with the air inlet passage 25, and when the bore 57 and passage 25 are so aligned, the bores 55 and 59 are blocked off. The vent bore 59 will only align with the vent passage 31, and when the bore 59 and passage 31 are so aligned, the bores 55 and 57 are blocked off by the inner surface 11 of the inlet side plate.

Referring again to FIGS. 1 and 2, the valve 1 is assembled such that the disc 3 is sandwiched between the inlet plate 5 and outlet plate 7 with the inlet face 47 of the disc 3 adjacent the inner surface 11 of the inlet plate 5 and the outlet face 49 adjacent the inner surface 33 of the outlet plate 7. The stub axle 22 of the disc inlet face 47 is rotatably received by the axle receiver 21 of the inner surface 11 of the inlet plate 5.

The housing plates 5 and 7 are held in parallel spaced relation to one another by a plurality of spacers 61 having lengths which approximate the thickness of the disc 3. Four spacers 61 are shown, however more or fewer could be used in different applications. The plates 5 and 7 are secured to the spacers 61 by threaded fasteners such as cap screws 63 which are received by threaded receivers 65 in the spacers 61 and aligned, counterbored receivers 67 in the plates 5 and 7.

Sealing between the disc 3 and the plates 5 and 7 is accomplished by means of O-rings 69, as shown in FIGS. 3 and 4. The water inlet passage 23, air inlet passage 25, and vent passage 31 each have a respective annular O-ring groove 71 which is cut into the inner surface 11 of the inlet side plate 5. The O-ring grooves 71 are concentric with the respective passages 23, 25, or 31 and are sized to receive the respective O-ring 69. In order to improve the seal around the passage 23, the respective O-ring 69 may be augmented by the addition of an annular sealing ring 72 which also fits within the respective O-ring groove 71 and is biased outwardly from the inlet side plate 5 by the O-ring 69.

The inlet side plate 5 may also be equipped with a secondary O-ring groove 73 which is concentric with the axle receiver 21 and surrounds all of the passages 23, 25, and 31. The secondary groove 73 receives an secondary O-ring 75 which serves as a backup to the O-rings 69. The outlet passage 43 is also equipped with an O-ring groove 71 cut into the inner surface 33 of the outlet side plate 7 which receives a respective O-ring 69. When the valve 1 is assembled, the O-rings 69 and 75 are compressed between the disc 3 and the respective plate 5 or 7 and prevent leakage of air or water through the junctures between the disc 3 and the plates 5 and 7.

The disc 3 is rotated by means of a handle 77 connected to the disc 3. The handle 77 includes a shaft 79 and a knob 81, the shaft 79 having a threaded distal end which is received by a threaded receiver 83 in the outside circumferential surface 51 of the disc 3. By gripping the knob 81 and rotating the disc 3, an operator can move the disc 3 into one of three operating positions: a water inlet position wherein the water inlet bore 55 is aligned with the water inlet passage 23, a purge position wherein the air inlet bore 57 is aligned with the air inlet passage 25, and a vent position wherein the vent bore 53 is aligned with the vent passage 31. Since the outlet passage 43 and disc outlet bore 45 are aligned along the axis of rotation of the disc 3, the passage 43 and bore 45 stay in constant communication no matter what the position of the disc 3.

The range of rotation of the disc 3 and handle 77 is limited to approximately 120 degrees by abutment of the handle shaft 79 against upper spacers 61a and 61b extending between the housing side plates 5 and 7. The water inlet passage 23 and water inlet bore 55 are preferably positioned in the inlet side plate 5 and disc 3 respectively such that the passage 23 and bore 55 are aligned when the handle shaft 79 is advanced into abutting relationship with spacer 61a. Similarly, the air inlet passage 25 and air inlet bore 57 are preferably positioned in the inlet side plate 5 and disc 3 respectively such that the passage 25 and bore 57 are aligned when the handle shaft 79 is advanced into abutting relationship with spacer 61b.

Figure 7:
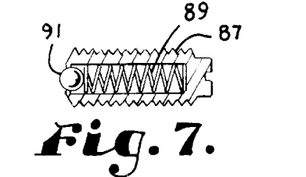
FIG. 7 is a cross-sectional view of the ball plunger detent mechanism of the valve assembly.
Figure 8:
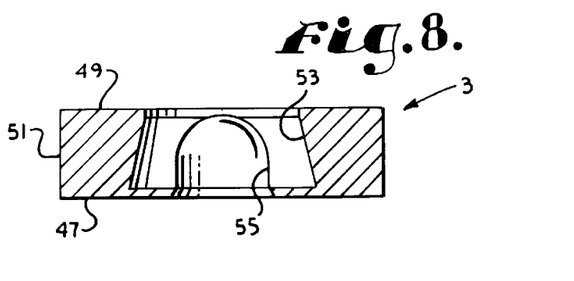
FIG. 8 is a cross-sectional view of the valve disk taken generally along line 8—8 in FIG. 5.

The valve 1 may also be provided with a detent mechanism 85 for identifying when the disc 3 in a desired one of the operating positions described above and for holding the disc 3 in that operating position. The detent mechanism 85 includes a ball plunger 87 (FIG. 7) having a spring 89 and detent ball 91. The ball plunger 87 is installed in a threaded receiver 93 in the outlet plate 7, the ball 91 being positioned to engage one of three dimples or detents 95 formed in the outlet face of the disc 3. The detents 95 are positioned such that one of the detents 95 is aligned with the ball plunger 87 when the disc 3 is in each of the three operating positions. The spring 89 urges the ball 91 into the respective detent 95 with sufficient pressure that the operator can feel when the disc 3 is in one of the three operating positions, but still allows the disc 3 to be easily rotated past the detent 95 to another of the operating positions.

In lieu of the detent mechanism 85, and as best seen in FIG. 1, the valve 1 may be equipped with a positive lock mechanism 97. The positive lock mechanism 97 includes a lock plate 99 installed between the valve side plates 5 and 7, and a locking member 101 slidably mounted in a receiver which passes through the lock plate 99. The locking member 101 is spring loaded toward the outer circumferential surface 51 of the disc 3 and has a tip which positively engages one of three detents 107 in the surface 51 which correspond to the three operating positions of the valve 1. Because the locking member 101 positively engages the detents 107, it must be pulled outwardly away from the disc 3 in order for the operator to be able to rotate the disc 3 to another of the operating positions. The positive lock mechanism 97 therefore provides an extra measure of safety in that the valve 1 cannot be inadvertently moved from one operating position to another.

III. Operation

Figure 9:
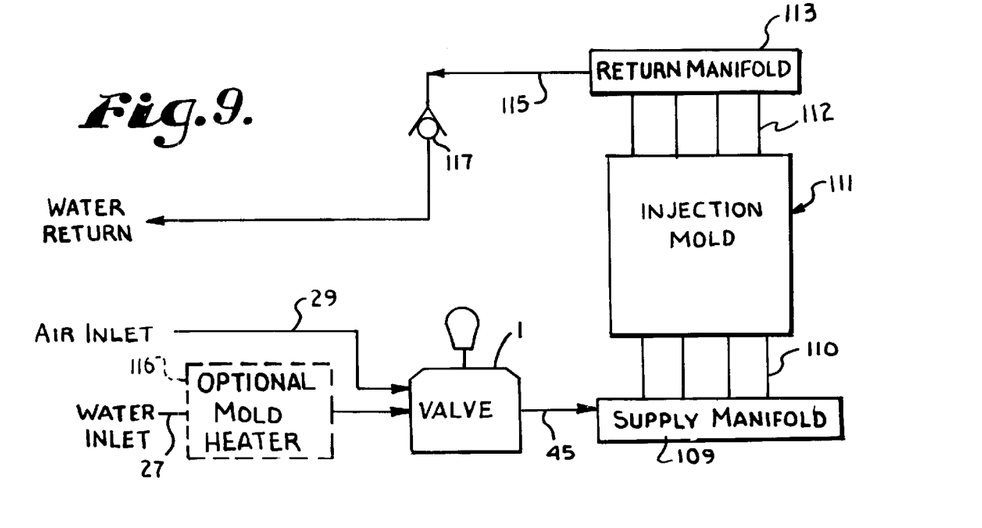
FIG. 9 is a schematic diagram showing an injection mold cooling system incorporating the valve assembly.

In use, the valve 1 is used to control the supply of cooling water to a supply manifold 109 of an injection mold 111. As shown in FIG. 9, water and air are supplied to the valve 1 through the water and air supply lines 27 and 29 which are connected to the respective water and air inlet passages 23 and 25 of the valve 1. The outlet line 45 is connected between the outlet passage 43 of the valve 1 and the supply manifold 109.

During the molding process, the valve 1 is placed in the water inlet position which allows cooling water to flow from the water supply line 27, through the valve 1, and out the outlet line 45 to the supply manifold 109. From the supply manifold 109, the cooling water flows through a plurality of mold supply lines 110, to the mold 111 which is cooled by the water. From the mold 111 the water flows through a plurality of mold return lines 112 to a return manifold 113 and out through a main water return line 115. In order be able to control the curing time of the material in the mold, the temperature of the cooling water may be adjusted by the use of an optional mold heater 116 in the water supply line 27.

When the molder wishes to change the mold 111, the valve 1 is moved to the purge position which causes the flow of cooling water to be shut off, and air to flow from the air supply line 29, through the valve 1, and out the outlet line 45 to the supply manifold 109. The air entering the cooling system forces the remaining cooling water out of the mold 111, the supply and return manifolds 109 and 113, and the mold cooling lines 110 and 112. The main water return line 115 should be equipped with a check valve 117 to prevent water from flowing back into the mold cooling system from the return line 115.

After the water is purged from the cooling system, the valve 1 is moved to the vent position and the air is released from the system through the vent passage 31 via the manual vent valve 32. The manual vent valve 32 is a simple push-button valve for venting air to the atmosphere, a suitable vent valve 32 being manufactured by Pneumadyne, Inc. of Plymouth Minn.

With the cooling water and purge air removed from the system, the mold 111 may be quickly and easily changed without the need of individually draining multiple hoses or cleaning up spilled cooling water which would present a safety hazard on the shop floor.

IV. Alternative Embodiment

A modified version of the present invention, valve 201 is shown in FIGS. 10–14. The valve 201 differs from the valve 1 mainly in that the disc 203 of the valve 201 includes only a single inlet bore 255 (FIG. 12) as opposed to the separate inlet bores 55, 57, and 59 of the disc 3 (FIG. 6). As was the case with the valve 1, the valve disc 203 is rotatably mounted between an inlet side 205 and an outlet side 207 of a valve housing 209. The inlet side 205 (FIG. 13) has a water inlet passage 223, an air inlet passage 225, and a vent passage 231 passing therethrough which are spaced radially outwardly from the axis of rotation of the disc 203. The outlet side 207 (FIG. 14) includes a single outlet passage 243 passing therethrough which is aligned with the axis of rotation of the disc 203.

Figures 10, 11, 12, 13, 14:
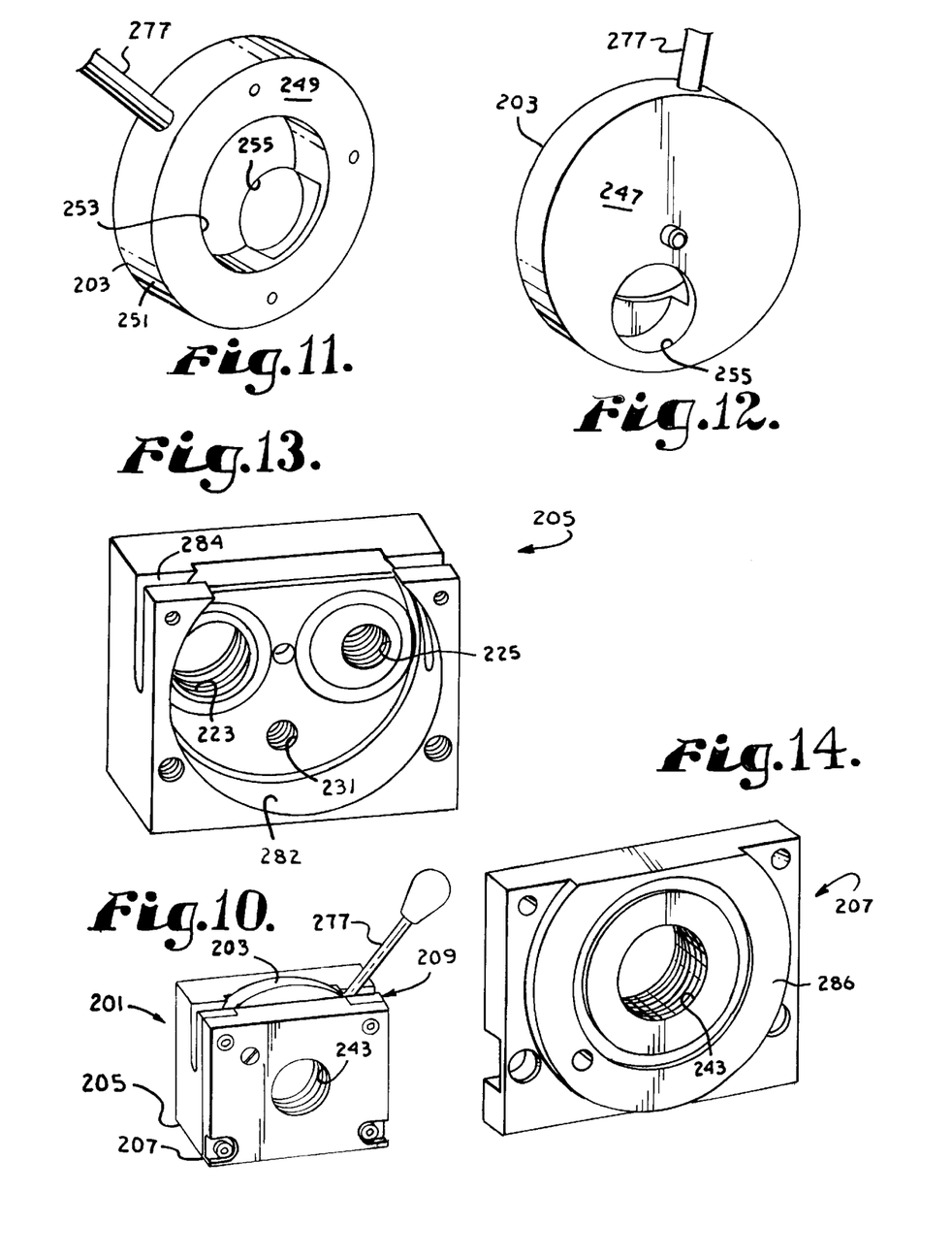
FIG. 10 is a perspective view of an alternative embodiment of the valve assembly.
FIG. 11 is a view of the valve disc of the alternative embodiment taken from the outlet side.
FIG. 12 is a view of the valve disc of the alternative embodiment taken from the inlet side.
FIG. 13 is a perspective view of the inlet side plate of the alternative embodiment showing the inner surface thereof
FIG. 14 is a perspective view of the outlet side plate of the alternative embodiment showing the inner surface thereof

The disc 203 (FIGS. 11 and 12) includes opposing inlet and outlet faces 247 and 249, a circumferential outer surface 251, and an outlet bore 253 which extends partially into the disc 203 from the outlet face 249 along the central axis of the disc 203. The single inlet bore 255 is spaced radially outward from the central axis of the disc 203 and extends between the disc inlet face 247 and the outlet bore 255. The valve 201 is assembled, as shown in FIG. 10, such that the disc 203 is sandwiched between the inlet side 205 and outlet side 207 with the inlet face 247 adjacent the inlet side 205 and the outlet face 249 adjacent the outlet side 207. A handle 277 extends radially outwardly from the disc circumferential surface 251.

As the disc 203 is rotated relative to the valve housing 209, the disc 203 can be moved into one of three operating positions: a water inlet position where the disc inlet bore 255 is aligned with the water inlet passage 223, a purge position where the disc inlet bore 255 is aligned with the air inlet passage 225, and a vent position where disc inlet bore 255 is aligned with the vent passage 231.

It should be noted that for a valve of the same general size, the arc traveled by the handle 277 of the valve 201 as it moves through the range of operating positions is greater than that of the handle 77 of the valve 1 since the same inlet bore 255 is used for each of the operating positions. In order to accommodate the longer arc of the handle 277, the valve housing 209 may have to be reconfigured somewhat from the housing 9 as there may not be sufficient room between spacers such as the spacers 61 to allow adequate room for the travel of the handle 277. One way to practice the housing 209 is to configure the inlet side 205 as shown in FIG. 12. In this embodiment the inlet side 205 includes a generally cylindrical cavity 282 which rotatably accepts the disc 203. A slot 284 is cut across the cavity 282 to allow for movement of the handle 277 through a full 180 degree arc. The outlet side 207 (FIG. 14) is substantially similar to the outlet side 7 of the valve 1, but may include a generally cylindrical raised portion 286 which extends into the cavity 282 when the valve 201 is assembled.

V. Conclusion

It is to be understood that while certain forms of the present invention have been illustrated and described herein, it is not to be limited to the specific forms or arrangement of parts described and shown. For example, the valve 1 has been described herein as being for use with an injection mold cooling system and as having a single outlet passage and multiple inlet passages, however it is to be understood that the valve I could be used in other applications, and that in some of those applications the flow through the valve 1 may be reversed such that the valve 1 effectively has a single inlet passage and multiple outlet passages. It is also to be noted that while the disc bores are depicted herein as being generally cylindrical in shape for ease of machining, it is foreseen that bores of other shapes could be utilized.

What is claimed and desired to be secured by Letters Patent is as follows:

1. A valve comprising:
   a) a housing having a first side and a second side;
   b) a disc mounted within said housing between said first side and said second side thereof and rotatable about a disc central axis, said disc including:
      i) a disc first face adjacent said housing first side;
      ii) a disc second face opposite said disc first face and adjacent said housing second side;
      iii) a first disc bore spaced radially outwardly from said disc central axis, said first disc bore extending from said disc first face partially through said disc; and
      iv) a second disc bore centered along said disc central axis and extending from said disc second face partially through said disc, said second disc bore having sufficient diameter and depth that said second disc bore communicates with said first disc bore;
   c) a plurality of first housing passages passing through said housing first side, said first housing passages being spaced radially outwardly from said disc central axis, at least one of said first housing passages selectively communicating with said first disc bore as said disc is rotated about said disc central axis; and
   d) a housing second passage passing through said housing second side, said housing second passage being generally in alignment with said disc central axis such that said housing second passage stays in constant communication with said second disc bore as said disc is rotated about said disc central axis.

2. The valve as in claim 1, further including one or more additional disc bores spaced radially outwardly from said disc central axis and extending from said disc first face partially through said disc and communicating with said second disc bore, each of said additional disc bores selectively communicating with one or more of said first housing passages as said disc is rotated about said disc central axis.

3. The valve as in claim 2, wherein:
   a) said first housing passages include a water inlet passage and an air inlet passage;
   b) said first disc bore is a water inlet bore;
   c) said additional disc bores include an air inlet bore; and
   d) said water inlet passage selectively communicates with only said water inlet bore and said air inlet passage selectively communicates with only said air inlet bore as said disc is rotated about said disc central axis.

4. The valve as in claim 3, wherein:
   a) said first housing passages further include a vent passage;
   b) said additional disc bores include a vent bore; and
   c) said vent passage selectively communicates with only said vent bore as said disc is rotated about said disc central axis.

5. A purge valve for use with an injection mold cooling system, said purge valve comprising:

a) a housing having an inlet side and an outlet side;
b) a disc mounted within said housing between said inlet side and said outlet side and rotatable about a disc central axis, said disc including:
  i) a disc inlet face adjacent said housing inlet side;
  ii) a disc outlet face opposite said disc inlet face and adjacent said housing outlet side;
  iii) an outlet bore centered along said disc central axis and extending from said disc outlet face partially through said disc;
  iv) a water inlet bore spaced radially outwardly from said disc central axis, said water inlet bore extending from said disc inlet face partially through said disc and communicating with said outlet bore; and
  v) an air inlet bore spaced radially outwardly from said disc central axis, said air inlet bore extending from said disc inlet face partially through said disc and communicating with said outlet bore;
c) a water inlet passage passing through said housing inlet side, said water inlet passage being spaced radially outwardly from said disc central axis such that said water inlet passage selectively communicates with said water inlet bore as said disc is rotated about said disc central axis;
d) an air inlet passage passing through said housing inlet side, said air inlet passage being spaced radially outwardly from said disc central axis such that said air inlet passage selectively communicates with said air inlet bore as said disc is rotated about said disc central axis; and
e) an outlet passage passing through said housing outlet side, said outlet passage being generally in alignment with said disc central axis such that said outlet passage stays in constant communication with said disc outlet bore as said disc is rotated about said disc central axis.

6. The purge valve as in claim 5, wherein said purge valve is a three-way purge valve which further includes:
a) a vent bore spaced radially outwardly from said disc central axis, said vent bore extending from said disc inlet face partially through said disc and communicating with said outlet bore; and
b) a vent passage passing through said housing inlet side, said vent passage being spaced radially outwardly from said disc central axis such that said vent passage selectively communicates with said vent bore as said disc is rotated about said disc central axis.

7. A purge valve for use with an injection mold cooling system, said purge valve comprising:
a) a housing having an inlet side and an outlet side;
b) a disc mounted within said housing between said inlet side and said outlet side and rotatable about a disc central axis, said disc including:
  i) a disc inlet face adjacent said housing inlet side;
  ii) a disc outlet face opposite said disc inlet face and adjacent said housing outlet side;
  iii) an inlet bore spaced radially outwardly from said disc central axis, said inlet bore extending from said disc inlet face partially through said disc; and
  iv) an outlet bore centered along said disc central axis and extending from said disc outlet face partially through said disc, said outlet bore having sufficient diameter and depth that said outlet bore communicates with said inlet bore;
c) a plurality of inlet passages passing through said housing inlet side, said inlet passages being spaced radially outwardly from said disc central axis such that each of said inlet passages selectively communicate with said disc inlet bore as said disc is rotated about said disc central axis; and
d) an outlet passage passing through said housing outlet side, said outlet passage being generally in alignment with said disc central axis such that said outlet passage stays in constant communication with said disc outlet bore as said disc is rotated about said disc central axis.

8. The purge valve as in claim 7, wherein said inlet passages include a water inlet passage and an air inlet passage.

9. The purge valve as in claim 8, wherein said purge valve further includes an air vent passage passing through said housing inlet side, said air vent passage being spaced radially outwardly from said disc central axis such that said air inlet passage selectively communicates with said disc inlet bore as said disc is rotated about said disc central axis.

10. A cooling system for an injection mold having a cooling water inlet opening and a cooling water outlet opening, said cooling system comprising:
a) a purge valve comprising:
  i) a housing having an inlet side and an outlet side;
  ii) a disc mounted within said housing between said inlet side and said outlet side and rotatable about a disc central axis, said disc including:
    (1) a disc inlet face adjacent said housing inlet side;
    (2) a disc outlet face opposite said disc inlet face and adjacent said housing outlet side;
    (3) an outlet bore centered along said disc central axis and extending from said disc outlet face partially through said disc;
    (4) a water inlet bore spaced radially outwardly from said disc central axis, said water inlet bore extending from said disc inlet face partially through said disc and communicating with said outlet bore; and
    (5) an air inlet bore spaced radially outwardly from said disc central axis, said air inlet bore extending from said disc inlet face partially through said disc and communicating with said outlet bore;
  iii) a water inlet passage passing through said housing inlet side, said water inlet passage being spaced radially outwardly from said disc central axis such that said water inlet passage selectively communicates with said water inlet bore as said disc is rotated about said disc central axis;
  iv) an air inlet passage passing through said housing inlet side, said air inlet passage being spaced radially outwardly from said disc central axis such that said air inlet passage selectively communicates with said air inlet bore as said disc is rotated about said disc central axis; and
  v) an outlet passage passing through said housing outlet side, said outlet passage being generally in alignment with said disc central axis such that said outlet passage stays in constant communication with said disc outlet bore as said disc is rotated about said disc central axis;
b) a cooling water source connected to said valve water inlet passage by a water inlet line;
c) a pressurized air source connected to said valve air inlet passage by an air inlet line;
d) an outlet line connecting said valve outlet passage to the cooling water inlet opening; and
e) a return line connecting the cooling water outlet opening to said cooling water source.

11. The cooling system as in claim 10 and further including a check valve installed in said return line, said check valve allowing cooling water to flow from the cooling water outlet opening to said cooling water source but preventing cooling water from flowing from said cooling water source to the cooling water outlet opening through said return line.

12. The cooling system as in claim 10, wherein said purge valve is a three-way purge valve which further includes:
   a) a vent bore spaced radially outwardly from said disc central axis, said vent bore extending from said disc inlet face partially through said disc and communicating with said outlet bore; and
   b) a vent passage passing through said housing inlet side, said vent passage being spaced radially outwardly from said disc central axis such that said vent passage selectively communicates with said vent bore as said disc is rotated about said disc central axis.

13. The cooling system as in claim 12 and further including a manual vent valve connected to said valve vent passage, said manual vent valve for selectively releasing air from said cooling system into the atmosphere.

14. A cooling system for an injection mold having a plurality of cooling water inlet openings and a plurality of cooling water outlet openings, said cooling system comprising:
   a) a three-way purge valve comprising:
      i) a housing having an inlet side and an outlet side;
      ii) a disc mounted within said housing between said inlet side and said outlet side and rotatable about a disc central axis, said disc including:
         (1) a disc inlet face adjacent said housing inlet side;
         (2) a disc outlet face opposite said disc inlet face and adjacent said housing outlet side;
         (3) an outlet bore centered along said disc central axis and extending from said disc outlet face partially through said disc;
         (4) a water inlet bore spaced radially outwardly from said disc central axis, said water inlet bore extending from said disc inlet face partially through said disc and communicating with said outlet bore;
         (5) an air inlet bore spaced radially outwardly from said disc central axis, said air inlet bore extending from said disc inlet face partially through said disc and communicating with said outlet bore; and
         (6) a vent bore spaced radially outwardly from said disc central axis, said vent bore extending from said disc inlet face partially through said disc and communicating with said outlet bore;
      iii) a water inlet passage passing through said housing inlet side, said water inlet passage being spaced radially outwardly from said disc central axis such that said water inlet passage selectively communicates with said water inlet bore as said disc is rotated about said disc central axis;
      iv) an air inlet passage passing through said housing inlet side, said air inlet passage being spaced radially outwardly from said disc central axis such that said air inlet passage selectively communicates with said air inlet bore as said disc is rotated about said disc central axis;
      v) a vent passage passing through said housing inlet side, said vent passage being spaced radially outwardly from said disc central axis such that said vent passage selectively communicates with said vent bore as said disc is rotated about said disc central axis; and
      vi) an outlet passage passing through said housing outlet side, said outlet passage being generally in alignment with said disc central axis such that said outlet passage stays in constant communication with said disc outlet bore as said disc is rotated about said disc central axis;
   b) a cooling water source connected to said valve water inlet passage by a water inlet line;
   c) a pressurized air source connected to said valve air inlet passage by an air inlet line;
   d) a supply manifold having an inlet opening and a plurality of outlet openings, said inlet opening being connected to said valve outlet passage by an outlet line and said outlet openings each being releaseably connectable to a respective one of the cooling water inlet openings by a respective mold supply line; and
   e) a return manifold having an outlet opening and a plurality of inlet openings, said inlet openings each being releaseably connectable to a respective one of the cooling water outlet openings by a respective mold return line, said outlet opening being connected to said cooling water source by a cooling water return line.

15. The cooling system as in claim 14 and further including a check valve installed in said cooling water return line, said check valve allowing cooling water to flow from said return manifold to said cooling water source but preventing cooling water from flowing from said cooling water source to said return manifold through said return line.

16. The cooling system as in claim 14 and further including a manual vent valve connected to said valve vent passage, said manual vent valve for selectively releasing air from said cooling system into the atmosphere.

* * * * *